Figure 4:
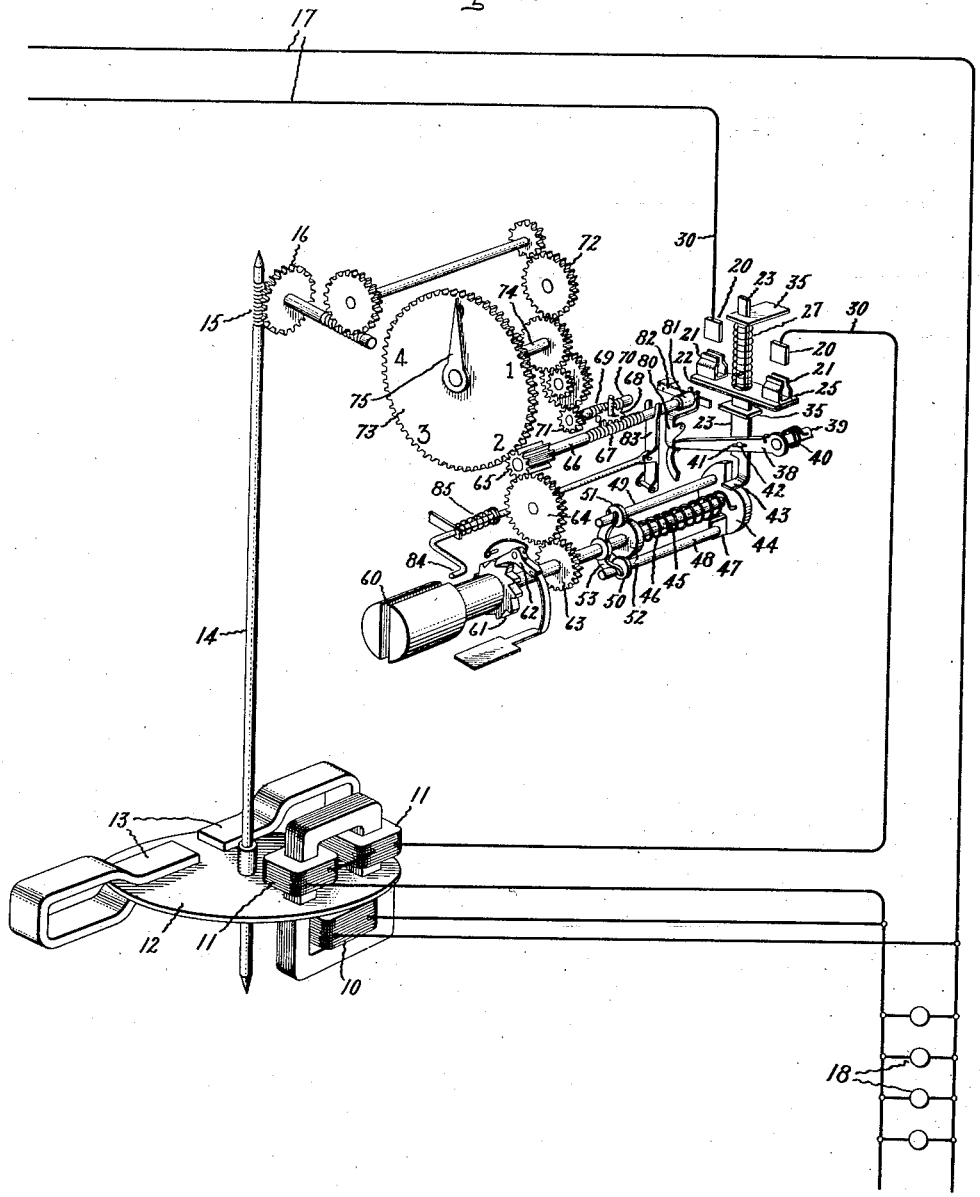

P. C. MORGANTHALER.
PREPAYMENT APPARATUS.
APPLICATION FILED MAY 9, 1916.
1,254,619.
Patented Jan. 22, 1918.
2 SHEETS—SHEET 1.
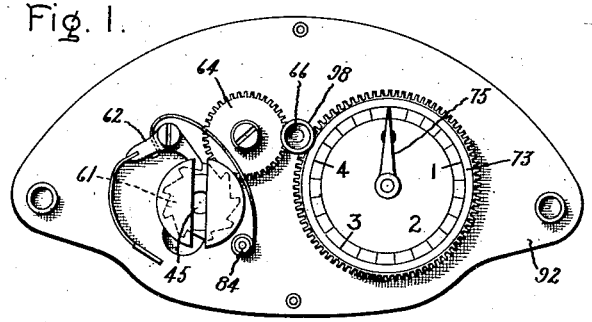
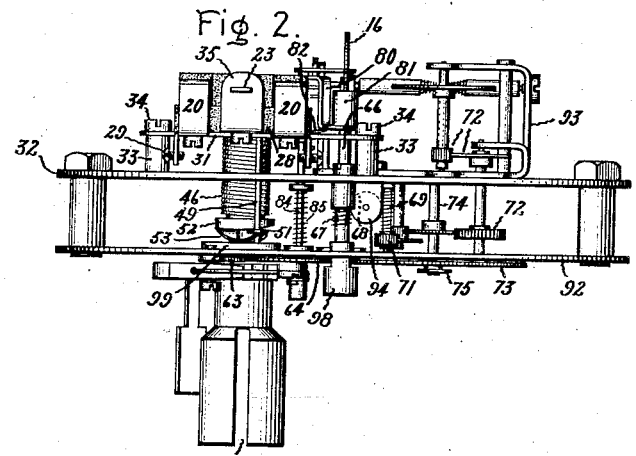
Inventor:
Peter C. Morganthaler,
by Albert G. Davis
His Attorney.

P. C. MORGANTHALER.
PREPAYMENT APPARATUS.
APPLICATION FILED MAY 9, 1916.

1,254,619.

Patented Jan. 22, 1918.
2 SHEETS—SHEET 2.

Inventor:
Peter C. Morganthaler,
by
His Attorney.

UNITED STATES PATENT OFFICE.

PETER C. MORGANTHALER, OF FORT WAYNE, INDIANA, ASSIGNOR TO GENERAL ELECTRIC COMPANY, A CORPORATION OF NEW YORK.

PREPAYMENT APPARATUS.

1,254,619.  Specification of Letters Patent.  Patented Jan. 22, 1918.

Application filed May 9, 1916. Serial No. 96,325.

*To all whom it may concern:*

Be it known that I, PETER C. MORGANTHALER, a citizen of the United States, residing at Fort Wayne, county of Allen, State of Indiana, have invented certain new and useful Improvements in Prepayment Apparatus, of which the following is a specification.

My invention relates to prepayment or coin-controlled apparatus and in particular to prepayment apparatus for metering devices, such for example as electric or gas meters. The object of the invention is to provide an improved prepayment apparatus and in particular an improved prepayment apparatus for metering devices, and more especially for electric motor meters. Other objects of the invention will be brought out in the course of the following description.

The sale of many commodities, such as electric energy, gas, and the like, can under certain conditions be most advantageously effected by prepayment apparatus. The purchaser or consumer pays for the commodity in advance by properly inserting one or more coins of a predetermined denomination in the prepayment apparatus, whereupon the apparatus operates to render available the amount of the commodity paid for. The prepayment idea theoretically possesses many advantages, chief among which are the elimination of bookkeeping and the absence of bad accounts. On account of these particular advantages the most promising field for prepayment apparatus is among the smaller consumers of the commodity in question. Take, for example, the case of electric energy. In many instances the central station management cannot afford to install the usual electric energy meter with its attendant service of monthly readings, bills, collections, etc., and in such cases a suitable electric prepayment apparatus is particularly desirable. The prepayment apparatus of the present day are, however, too complicated and too expensive for such uses, and, accordingly, there is an increasing demand for a simple, inexpensive and reliable prepayment apparatus, and particularly for a prepayment electric meter of this character. The principal aim of my present invention is to provide a cheap and constructively simple prepayment apparatus, and more particularly to provide an inexpensive prepayment attachment of simple construction for electric meters which can be conveniently substituted in the present day types of electric meters for the ordinary ratio gearing and register train.

The novel features which I believe to be patentably characteristic of my invention are definitely indicated in the claims appended hereto. The invention itself will be better understood from the following description taken in conjunction with the accompanying drawings, in which:

Figure 1 is a front elevation of a prepayment mechanism embodying my present invention and particularly designed for a prepayment apparatus for electric energy; Fig. 2 is a top view and Fig. 3 is a back elevation of the prepayment mechanism of Fig. 1; and Fig. 4 is an explanatory diagrammatic view in perspective of the prepayment attachment of Figs. 2 and 3 in combination with an induction electric meter. In the perspective view of Fig. 4 certain of the elements of the prepayment mechanism have been slightly distorted and rearranged in order to more clearly explain the construction and operation of the mechanism of Figs. 1, 2 and 3.

In the accompanying drawings I have illustrated my present invention embodied in a prepayment electric meter, although it will of course be understood from the foregoing discussion that the invention is equally applicable to prepayment apparatus for other commodities than electric energy. As thus applied to an electric energy meter, the entire prepayment mechanism of my present invention is assembled as a unitary structure upon two spaced supporting plates 32 and 92 in a manner analogous to the construction of the ratio gearing and register of an electric motor meter. The prepayment mechanism is thus adapted to be mounted in an electric meter as a unitary structure. In Fig. 4 of the drawings, I have diagrammatically illustrated the prepayment mechanism operatively related to an induction electric meter. This meter has a potential coil 10 coöperating with series coils 11 to produce a shifting magnetic field within the influence of which is rotatably mounted a metallic disk armature 12. Damping magnets 13 of the usual type are operatively mounted to retard the motion of the disk armature. The armature is secured to a pivotally mounted shaft 14 provided near its upper end with the usual worm 15. The first gear 16 of the ratio gearing of the prepayment mechanism is adapted to mesh with the worm 15.

The prepayment mechanism controls the supply of electric energy from the mains 17 to the translating devices 18 by means of a switch having fixed contacts 20 and coöperating movable spring contacts 21. The movable contacts 21 are electrically connected together by a metallic strip 25 which may be integral therewith. The connecting strip 25 is secured to a rigid strip 22 of insulating material loosely mounted upon a vertical arm 23, whereby the contacts 21 are insulated from this arm, as hereinafter more fully explained. The strip 25 is preferably covered by a piece of insulating material 26 (Fig. 3), in which case the strip 25 may be securely riveted between the two pieces of insulating material 22 and 26. The lower part of the vertical arm 23 is wider than the upper part upon which the contacts 21 are mounted, whereby the arm is provided with a shoulder upon which the insulating strip 22 and associated contacts 21 are seated (Figs. 3 and 4). It will of course be understood that the slot through the contact strip 25 for the accommodation of the arm 23 is slightly larger than the slots through the insulating pieces 22 and 26, so that the contacts 21 are insulatively mounted. A spring 27 surrounds the upper portion of the arm 23 and assists in effecting a quick break of the switch contacts, as will be more clearly understood from the following description.

The fixed contacts 20 are mounted upon a block of insulating material 28, and are provided with binding posts 29 for the leading-in wires 30. The insulating block 28 is mounted upon a triangular metallic plate 31 secured to the rear supporting plate 32 by means of posts 33 and screws 34. Guides 35 for the arm 23 are secured between the block 28 and the triangular plate 31.

An L-shaped lever 38 is pivotally mounted upon a post 39 secured to the plate 31. A coil spring 40 surrounds the post 39 and tends to force the lever downwardly. The lever has a slot 41 through which extends a pin 42 secured near the lower end of the arm 23. The lower end of the arm 23 is bent to provide a cam follower 43 which is operatively related to a cam 44. The cam 44 is of the duplex type having two corresponding cam surfaces on its periphery. The cam is loosely mounted upon a shaft 45. A coil spring 46 surrounds a portion of the shaft 45, and is secured at one end to the shaft and at the other end to the cam 44. This spring is initially under tension and its operation will be better understood hereinafter. The cam is provided with a lug 47 which engages with one or the other of two pins 48 and 49, to limit movement of the cam in response to the action of the spring 46.

The pins 48 and 49 are positioned diametrically opposite with respect to the axis of the shaft 45, and are provided with shoulders 50 and 51, respectively. The shoulders 50 and 51 are held against a cam 52 secured to the shaft 45, by means of a spring clip 53 loosely mounted on the shaft 45. The shape of the cam 52 is such that the two pins 48 and 49 are given longitudinally reciprocatory movements in relatively opposite directions by the rotation of the shaft 45. Thus, when the pin 49 is being pressed forward, the pin 48 is being pressed backwardly, and, in the position of the elements represented in Fig. 4 of the drawings, when the pin 48 has been withdrawn from engagement from the lug 47, the pin 49 will have been moved into position to engage the lug 47, thus arresting movement of the cam 44 after it has turned through one-half of a revolution. Referring to Figs. 2 and 3 of the drawings it will be seen that the pins 48 and 49 are mounted at one end in a bearing plate 99 fastened to the front plate 92, while their other ends extend through bearing holes in the triangular plate 31. The spring clip 53 while loosely mounted on the shaft 45 is held between the bearing plate 99 and the cam 52.

The shaft 45 is adapted to be manually turned by the coin driven device. In order to simplify the accompanying drawings, only the elementary parts of the coin-driven device have been shown. A complete description of the coin-driven device represented in the accompanying drawings will be found in the United States patent to Wood, No. 849,448, patented April 9, 1907. The outer end of the shaft 45 is enlarged and is provided with a coin slot 60. A ratchet wheel 61 and coöperating pawl 62 are provided for permitting rotation of the shaft 45 in one direction only. A gear 63 secured to the shaft 45 drives through an idler 64 a pinion 65 secured to a longitudinally movable shaft 66. The shaft 66 has a worm gear 67 meshing with a pinion 68. A second worm gear 69 on a shaft 70, parallel to the shaft 66, also meshes with the pinion 68. The two worm gears 67 and 69 form with the pinion 68 a differential gearing whose action will be understood when the operation of the prepayment mechanism is described in detail. A pinion 71 is secured to the shaft 70 and is adapted to be driven by a train of reduction gearing 72 operatively connected to the meter shaft 14. A dial 73 is mounted upon a gear meshing with the pinion 65, and is thus moved when the shaft 45 is rotated. The dial 73 and coöperating gear are loosely mounted upon a shaft 74 of the gear train 72. An indicating hand 75 is secured to one end of the shaft 74 in front of the dial 73 and is thus adapted to be rotated by the meter shaft 14. The direction of rotation of the meter shaft 14 upon a consumption of energy in the translating devices 18 is relatively opposite to the direction in which the shaft 45 can be manually rotated by the coin-driven device, and hence the dial 73 and indicating hand 75 move in opposite directions.

The remaining details of construction of the mechanism will, it is believed, be better understood from a description of the operation. When a coin is dropped in the slot 60 and the shaft 45 manually rotated by the coin-driven device, the pin 48 will be withdrawn from engagement with the lug 47 while the pin 49 will be moved into a position to engage the lug after the cam 44 has made one-half of a revolution. The shaft 45 can be rotated in only one direction due to the presence of the pawl 62 and ratchet 61, and this direction of rotation of the shaft 45 is relatively opposite to that of the meter shaft 14. In other words the shaft 45 when manually rotated tends to turn the pinion 68 in the opposite direction to that in which the pinion is turned by the rotation of the meter shaft. The spring 46 is always under an initial tension and, in addition, as the shaft 45 is manually rotated the spring 46 is further energized. The cam 52 operates to reciprocate the stop pins 48 and 49 in relatively opposite directions, and just as the shaft 45 completes one-half a revolution one stop is withdrawn from engagement with the lug 47 of the cam 44 while the other stop pin is moved into position to engage the lug and hence to arrest movement of the cam 44 after the latter has made one-half a revolution. The spring 46 thus operates to rotate the cam through one-half a revolution each time the shaft 45 is manually rotated one-half a revolution. The tension of the spring 46 is designed to give a quick snap action in the closing of the switch contacts.

The one-half revolution of the cam 44 (counter-clockwise Figs. 3 and 4) forces the arm 23 upwardly and closes the line switch by the engagement of the movable contacts 21 with the fixed contacts 20. The crook in the end of the lever 38 engages with a projection on a pivoted locking member 80 which holds the switch closed. Rotation of the shaft 45 also rotates the shaft 66, and, since the pinion 68 is locked by its engagement with the worm 69, which for the moment may be considered as stationary, the shaft 66 will move longitudinally, that is toward the left as viewed in Fig. 4 of the drawings. The boss 81 at the end of the shaft 66 is moved away from the locking member 80, and the latter is held by leaf spring 82 in firm engagement with the lever 38. The line switch being thus closed electric energy can be taken by the translating devices 18. As energy is consumed in the devices 18, the disk 12 and meter shaft 14 rotate in the well known manner, and thereby turn the gear 71 and shaft 70. The pinion 68 is thus turned and operates to move the worm shaft 66 longitudinally back to its initial position, that is toward the right as viewed in Fig. 4 of the drawings. When the quantity of electricity given for the particular coin unit has been consumed, the boss 81 engages the locking member 80 and pushes it from the crook in the lever 38. The spring 40 thereupon forces the arm 23 downwardly and opens the line switch. When the line switch is closed the spring 27 is under a slight tension, and when the lever 38 is unlocked this spring assists in quickly breaking the electrical engagement between the fixed contacts 20 and the movable contacts 21 of the switch, thereby preventing the formation of an objectionable arc when these operating contacts are disengaged.

When one coin has been inserted in the slot 60 and the shaft 45 turned through one-half a revolution the coin is deposited in a suitable box in the well understood manner. The one-half revolution of the shaft 45 causes the dial 73 to turn through one-fifth of a revolution, so that the indicating hand 75 is opposite numeral 1 on the dial, thus indicating that one coin unit of electric energy is available to the consumer. The line switch is closed in the manner hereinbefore described. If another coin is dropped in the slot 60 and the shaft 45 turned through one-half a revolution, the worm shaft 66 will be again moved outwardly, and, furthermore, the dial 73 will be moved until numeral 2 is opposite the indicating hand 75. Similarly, four coins may be dropped in the slot 60 and the shaft 45 turned through four one-half revolutions. The worm shaft 66 will now be moved so far toward the left that the boss 81 engages with a lever 83 carrying a pin 84. The extremity of the pin 84 coöperates with the coin-drive for the shaft 45 to prevent further rotation of the shaft after the worm shaft 66 has been moved a distance corresponding to four coin units. As electric energy is consumed in the translating devices 18, the worm shaft 66 is moved backwardly and a spring 85 surrounding the pin 84 operates to withdraw the latter from its locking engagement with the coin-drive. The rotation of the meter shaft 14 turns the indicating hand 75 backwardly with respect to the dial 73, so that the relative positions of the hand and dial indicate the number of coin units of electric energy which are available to the consumer. When the hand 75 moves to a position opposite numeral 0 the boss 81 engages the locking member 80 and trips the line switch.

The foregoing description has referred more particularly to the diagrammatic perspective view of the apparatus shown in Fig. 4 of the drawings. Reference to Figs. 1, 2 and 3 will show that the entire prepayment mechanism is mounted upon the two spaced parallel plates 32 and 92. The ratio gearing beginning with the first gear 16, which is adapted to be operatively connected to the worm 15 of the meter shaft, is mounted upon a bracket 93 secured to the rear plate 32. The main manually coin-driven shaft 45 passes through the two plates 32 and 92 and through the triangular plate 31. The longitudinally movable shaft 66 is mounted in a bearing boss 98 secured to the front plate 92 and extends through a bearing hole in the triangular plate 31, while the coöperating shaft 70 of the differential gearing of the prepayment mechanism is mounted between the two parallel plates 32 and 92. The gear 68 of the differential is mounted between two brackets 94 struck up from the rear plate 32.

It will be observed from the foregoing description that my improved prepayment mechanism is of simple construction and can be very conveniently assembled on two parallel plates corresponding in size and configuration to the plates now generally employed for supporting the ratio gearing and register of an electric meter. The space required for the prepayment mechanism is no greater than the space now allowed for the ratio gearing and register, and hence the meter and prepayement mechanism can be assembled together in a case of substantially the same size and configuration as employed for the ordinary meter. The prepayment mechanism itself is of rugged and simple construction and has few parts to wear out, and consequently a minimum likelihood of the mechanism getting out of order.

I have explained my invention by illustrating and describing a certain specific embodiment thereof, but it will be readily understood by those skilled in the art that the invention may be embodied in many other forms than that shown and described. I, accordingly, do not wish to be restricted to the particular form or construction disclosed herein by way of example for the purpose of setting forth my invention in accordance with the patent statutes. The terms of the appended claims are, therefore, not restricted to the precise structure disclosed but are intended to cover all changes and modifications within the spirit and scope of my invention.

What I claim as new and desire to secure by Letters Patent of the United States, is:

1. A prepayment apparatus comprising a rotatable member, means actuated by the delivery of a commodity to be sold for driving said member, a manually rotatable member, means including two worm gears one of which is longitudinally movable and a pinion engaging the worm gears for operatively connecting said members, an electric circuit including a switch for controlling the delivery of the commodity, means actuated by said manually rotatable shaft for moving said switch to its circuit-closing position, means for locking said switch in its circuit-closing position, and means whereby said longitudinally movable worm gear operates to release said locking means when said worm gear has moved its full distance in one direction.

2. A prepayment apparatus comprising an electric circuit including a switch, a rotatable shaft, means actuated by the delivery of a commodity to be sold for driving said shaft, a second rotatable shaft adapted to be manually rotated in a direction relatively opposite to the direction of rotation of said first mentioned shaft, means including a differential gearing operatively connecting said shafts, means actuated by said manually rotatable shaft for moving said switch to its circuit-closing position, means for locking said switch in its circuit-closing position, and means whereby said differential gearing operates to release said locking means when said first mentioned rotatable shaft completes a predetermined number of revolutions after the movement of said switch to its circuit-closing position.

3. A prepayment apparatus comprising an electric circuit including a switch, a rotatable shaft, means actuated by the delivery of a commodity to be sold for driving said shaft, a second rotatable shaft adapted to be manually rotated in a direction relatively opposite to the direction of rotation of said first mentioned shaft, means including two worm gears one of which is longitudinally movable and a pinion engaging the worm gears for operatively connecting said shafts, means actuated by said manually rotatable shaft for moving said switch to its circuit-closing position, means for locking said switch in its circuit-closing position, and means whereby said longitudinally movable worm gear operates to release said locking means when said worm gear has moved its full distance in one direction.

4. A prepayment apparatus comprising a rotatable shaft, a meter for driving said shaft, a manually rotatable shaft arranged for longitudinal movement, a worm gear on each of said shafts, a pinion engaging said worm gears, an electric circuit controlling means operatively associated with said meter, means for moving said circuit controlling means to its circuit-closing position when said manually rotatable shaft is rotated, means for locking said circuit controlling means in its circuit-closing position, and means whereby said longitudinally movable shaft operates to release said locking means when said shaft has moved its full distance in one direction.

5. A prepayment apparatus comprising an electric circuit including a switch, a rotatable shaft, means actuated by the delivery of a commodity to be sold for driving said shaft, a second rotatable shaft arranged for longitudinal movement, means for manually rotating said second shaft in a direction relatively opposite to the direction of rotation of said first mentioned shaft, a worm gear on each of said shafts, a pinion engaging said worm gears, means for moving said switch to its circuit-closing position when said second shaft is manually rotated, means for locking said switch in its circuit-closing position, and means whereby said second shaft operates to release said locking means when this shaft has longitudinally moved its full distance in one direction.

6. A prepayment apparatus comprising a rotatable shaft arranged for longitudinal movement, a manually rotatable member operatively connected to said second shaft and adapted to rotate the second shaft in a direction relatively opposite to the direction of rotation of said first mentioned shaft, a worm gear on each of said shafts, a pinion engaging said worm gears, an electric circuit including a switch operatively associated with said meter, a cam operatively related to said member and adapted to move said switch to its circuit-closing position, means normally operating to lock said switch in its circuit-closing position, and means whereby said second shaft operates to release said switch locking means when the shaft has moved longitudinally its full distance in one direction.

7. A prepayment apparatus comprising an electric circuit including a switch, a rotatable shaft, means actuated by the delivery of a commodity to be sold for driving said shaft, a second rotatable shaft, a manually rotatable member operatively connected to said second shaft and adapted to rotate the second shaft in a direction relatively opposite to the direction of rotation of said first mentioned shaft, means including a differential gearing operatively connecting said shafts, means operatively related to said manually rotatable member for closing said switch with a snap action when said member is rotated through one-half a revolution, means for locking said switch in its circuit-closing position after one-half a revolution of said member whereby further rotation of said member has no effect on said switch, and means whereby said differential gearing operates to release said switch locking means when said first mentioned rotatable shaft completes a predetermined number of revolutions after the movement of said switch to its circuit-closing position.

8. A prepayment apparatus comprising an electric circuit including a switch, a rotatable shaft, means actuated by the delivery of a commodity to be sold for driving said shaft, a second rotatable shaft arranged for longitudinal movement, a manually rotatable member operatively connected to said second shaft and adapted to rotate the second shaft in a direction relatively opposite to the direction of rotation of said first mentioned shaft, a worm gear on each of said shafts, a pinion engaging said worm gears, means operatively related to said member for closing said switch with a snap action when said member is manually rotated through one-half a revolution, means for locking said switch in its circuit-closing position after one-half a revolution of said member whereby further rotation of said member has no effect on said switch, and means whereby said second shaft operates to release said locking means when the shaft has moved longitudinally its full distance in one direction.

9. A prepayment apparatus comprising an electric circuit including a switch, a rotatable shaft, means actuated by the delivery of a commodity to be sold for driving said shaft, a second rotatable shaft, a manually rotatable member operatively connected to said second shaft and adapted to rotate the second shaft in a direction relatively opposite to the direction of rotation of said first mentioned shaft, means including a differential gearing operatively connecting said shafts, a cam adapted to move said switch to its circuit-closing position, a spring for actuating said cam, means whereby rotation of said member operates to energize said spring, a pair of stop pins for restraining movement of said cam in response to the action of said spring, means associated with said member for imparting reciprocatory movements in relatively opposite directions to said stop pins whereby one pin moves into position to restrain movement of the cam as the other pin withdraws to permit movement of the cam, means for locking said switch in its circuit-closing position when moved to such position by said cam, and means whereby said differential gearing operates to release said locking means when said first mentioned shaft completes a predetermined number of revolutions after the movement of said switch to its circuit-closing position.

10. A prepayment apparatus comprising an electric circuit including a switch, a rotatable shaft, means actuated by the delivery of a commodity to be sold for driving said shaft, a second rotatable shaft arranged for longitudinal movement, a manually rotatable member operatively connected to said second shaft and adapted to rotate the second shaft in a direction relatively opposite to the direction of rotation of said first mentioned shaft, a worm gear on each of said shafts, a pinion engaging said worm gears, a cam adapted to move said switch to its circuit-closing position, a spring for actuating said cam, means whereby rotation of said member operates to energize said spring, a pair of stop pins for restraining movement of said cam in response to the action of said spring, means associated with said member for imparting a reciprocatory movement to said stop pins such that one pin moves into position to restrain movement of the cam as the other pin withdraws to permit movement of the cam, means for locking said switch in its circuit-closing position when moved to such position by said cam, and means whereby said second shaft operates to release said locking means when the shaft has moved longitudinally its full distance in one direction.

In witness whereof, I have hereunto set my hand this 5th day of May, 1916.

PETER C. MORGANTHALER.